United States Patent [19]
Swanberg

[11] Patent Number: 5,193,013
[45] Date of Patent: Mar. 9, 1993

[54] SCANNER WITH NON-LINEARITY COMPENSATING PIXEL CLOCK

[75] Inventor: Melvin E. Swanberg, Claremont, Calif.

[73] Assignee: Olive Tree Technology, Inc., San Marino, Calif.

[21] Appl. No.: 529,959

[22] Filed: May 29, 1990

[51] Int. Cl.$^5$ .............................................. H04N 1/04
[52] U.S. Cl. ................................... 358/481; 331/10; 250/236; 359/218
[58] Field of Search ................. 358/481, 480; 350/6.7, 350/6.8; 250/235, 236; 331/10

[56] References Cited

U.S. PATENT DOCUMENTS

| | | | |
|---|---|---|---|
| 4,518,998 | 5/1985 | Warner | 250/235 |
| 4,635,000 | 1/1987 | Swanberg | 358/481 |
| 4,729,617 | 3/1988 | Shimada et al. | 358/208 |

FOREIGN PATENT DOCUMENTS

| | | | |
|---|---|---|---|
| 0106918 | 6/1983 | Japan | 331/10 |
| 0165427 | 9/1983 | Japan | 331/10 |

OTHER PUBLICATIONS

Michael James Underhill, Frequency Synthesizer, Aug. 1976, Appli. No. 13997/74, G6B1447418.
D. Z. Phillips, HF Frequency Synthesizer Adaptive to various Tuning time & Frequency Increment Requirements, Jun. 1978, 91170061.

Primary Examiner—Jin F. Ng
Assistant Examiner—Nina Tong
Attorney, Agent, or Firm—Matthew F. Jodziewicz

[57] ABSTRACT

A scanner system includes a light source for producing a light beam and a scanner for directing the light beam to a spot on a surface to a be scanned and for moving the spot across the surface along a scan line of predetermined length in a series of scan cycles. A reference clock produces a train of M reference pulses during each of the scan cycles such that each of the reference pulses represents the occurrence of a respective one of M segments of the scan cycle. An oscillator produces a train of clock pulses for use in controlling the light beam at a predetermined number of desired pixel positions along the scan line while a frequency control circuit responsive to the reference pulses varies the frequency of the oscillator during the occurrence of each of the M segments of the scan cycle in order to approximate an ideal frequency variation curve the entire scan cycle.

25 Claims, 6 Drawing Sheets

SCANNER WITH NON-LINEARITY COMPENSATING PIXEL CLOCK

BACKGROUND OF THE INVENTION

1. Technical Field

This invention relates generally to input and output scanners, and more particularly to a scanner having a pixel clock that compensates for scanner non-linearity.

2. Background Information

A scanner includes some type of scanning means for directing a light beam to a spot on a surface to be scanned. It does so in such a way that the spot moves across the surface along a scan line in a precisely controlled scan cycle. That enables various input and output functions such as reading a document or printing a page.

Scanner non-linearity refers to variations in spot velocity occurring as the spot moves along the scan line during the scan cycle. It is typically caused in such systems as polygon or galvanometer laser scanner systems by system geometry or a velocity variation of the scanning means and it can affect scanner performance. A scanner having a multifaceted rotating polygon, for example, directs the light beam at a constant angular velocity. But the spot is farther from the polygon facets at the ends of the scan line than it is at the center and so spot velocity increases as the spot moves from the center toward the ends.

Some scanners compensate for such non-linearity electronically using a variable frequency pixel clock (sometimes called a scanning clock). The pixel clock produces a pulse train (i.e., a PIXEL CLOCK signal) that is used to turn the light beam on and off at each pixel position along the scan line. Varying the clock frequency and thereby the timing of individual pulses in the pulse train serves to control pixel placement along the scan line. That is done according to variations in spot velocity in order to more evenly space the pixels and thereby at least partially compensate for what is sometimes called pixel position distortion (i.e., uneven pixel spacing caused by scanner non-linearity). The technique can even be used to introduce distortion where desired or to compensate for distortion intrinsic to input data.

One existing pixel clock includes a voltage controlled oscillator (VCO) in a phase locked loop (PPL). The output of the VCO provides the basic PIXEL CLOCK signal and the phase locked loop is locked to reference pulses produced by what is sometimes called a grid clock. So called for the accurately ruled grating or grid employed, the grid clock includes suitable componentry for causing a second or reference light beam to be directed by the multifaceted rotating polygon or other scanning means toward the grid in such a way that the second light beam moves along the grid as the primary or scanning light beam moves along the scan line.

Meanwhile, alternating clear and opaque areas on the grid (or reflecting and non-reflecting areas) modulate the second beam. To better visualize the process, consider a grid used with a nine inch scan line. Such a grid may include, for example, a series of 301 parallel lines etched at 0.03 inch intervals on a ten to twelve inch strip of glass. Thus, the grid extends nine inches like the scan line and as the second beam moves across the grid, the etched lines periodically block passage of light through the glass. So detector circuitry collecting and processing light on the far side of the glass produces a series of 300 reference pulses that provide accurate information about spot velocity and position along the scan line, each reference pulse representing an increment of spot movement along the scan line.

Locking the phase locked loop to the reference pulses controls the number of clock pulses produced for each of the scan cycles. In addition, it compensates somewhat for scanner non-linearity by forcing phase coincidence between each of the reference pulses and a corresponding one of the clock pulses. That causes the clock frequency to vary in a way that approximates the ideal case in which the clock frequency is proportional to spot velocity (which varies according to spot position along the scan line). A large number of reference pulses per scan cycle improves the approximation. In that regard, the grid clock described above, produces 300 reference pulses per scan cycle. For a typical resolution of 300 pixels or dots-per-inch (dpi) and a nine inch long scan line, that translates to nine pixels per reference pulse.

One drawback in using a grid clock of the type described is the cost and complexity. The fine grid pattern, the need to image the reference beam to a high resolution spot on the grid, and the required light collection optics all contribute. In addition, local imperfections on the grid can cause significant phase jitter that limits usefulness of the design. So it is desirable to have a better way to control the pixel clock.

U.S. Pat. No. 4,729,617 describes a scanning clock generating device that includes a voltage controlled oscillator in a phase locked loop. The PLL is locked to reference pulses produced by a position control clock instead of a grid clock, and so some grid clock problems are avoided in the process of approximating the ideal frequency variation curve 40 shown in FIG. 3 of that patent. One problem with the device, however, is that it works for only one scanning speed, requiring programming modifications along with low pass filter and other circuit changes to accommodate a two speed scanner, for example. In addition, the PLL is configured as a control system in which a constant rate of change of the controlled variable requires a constant error signal under steady state conditions (i.e., a type 1 control system). Instead of forcing phase coincidence it actually requires a phase error. That can impair accuracy. So it is desirable to have a way to control the pixel clock that overcomes those problems as well.

SUMMARY OF THE INVENTION

This invention solves the problems outlined above by providing a scanner system that varies the pixel clock frequency in a way producing a segmented fit of the ideal frequency variation curve. The number of segments is chosen and a substantially constant rate of variation is established for each segment so as to achieve a sufficiently accurate approximation or fit of the ideal variation. So doing results in far fewer reference pulses per scan cycle so that a very course grid clock may be used, and that overcomes problems of cost and complexity. In combination with the averaging, analog storage frequency control circuitry employed, it overcomes phase jitter as well.

In addition, the system self-adjusts to different scanning speeds without reprogramming or component changes. That is accomplished using a stored analog error signal for each segment. Moreover, the system employs a phase locked loop configured as a control system in which a constant acceleration of the controlled variable requires a constant error signal under steady state conditions (i.e., a type 2 control system). As a result, it tends to force phase coincidence between the reference pulses and clock pulses, and that helps produce greater accuracy.

Generally, a scanner system constructed according to the invention includes a light source for producing a light beam and scanning means for directing the light beam to a spot on a surface to be scanned that is located at a predetermined location relative to the scanning means. That is done so that the spot moves across the surface along a scan line of predetermined length in a series of scan cycles. The system also includes means defining a reference clock for producing a train of M reference pulses during each of the scan cycles such that each of the M reference pulses represents the occurrence of a respective one of M segments of the scan cycle, M being an integer. It may take the form of a grid clock, a separate oscillator and associated logic circuitry configured to produce the reference pulses, or even a motor reference oscillator and suitable associated logic circuitry.

A clock oscillator is also provided for producing a train of clock pulses for use in controlling the light beam at a predetermined number of desired pixel positions along the scan line. It may include a VCO in a phase locked loop, for example, and it is controlled by a frequency control circuit. The frequency control circuit responds to the reference pulses and varies the frequency of the oscillator during the occurrence of each of the M segments of the scan cycle in order to approximate an ideal frequency variation curve over the entire scan cycle that would compensate for scanner non-linearity.

Preferably, the frequency control circuit is configured to vary the frequency of the oscillator continuously during the occurrence of each of the M segments of the scan cycle at a rate established for that segment of the scan cycle. Preferably, the frequency control circuit is configured to adjust the rate for each of the M segments of the scan cycle toward a value achieving phase coincidence between the reference pulse representing that segment of the scan cycle and the first one of the clock pulses occurring for that segment of the scan cycle. In addition, the frequency control means is preferably configured to vary the frequency of the oscillator at a substantially constant rate during each segment, and it may take the form of a multi-element analog storage circuit generally similar to the switched filter circuits described in U.S. Pat. Nos. 4,635,000, 4,663,523, and 4,694,156.

In line with the foregoing, a method of varying the frequency of a pixel clock oscillator in order to compensate for scanner non-linearity includes the step of providing an oscillator for producing a train of N clock pulses for each of M segments of a scan cycle during which a spot produced by a scanning light beam moves along a respective one of M segments of a scan line. The method proceeds by producing a train of M reference pulses such that each of the reference pulses represents the occurrence of a respective one of the M segments of the scan cycle, comparing the occurrence of each one of the M reference pulses with the occurrence of a first one of the N clock pulses for the respective one of the M segments of the scan cycle, producing a plurality of M stored error signals according to the comparisons, and varying the frequency of the oscillator during the occurrence of each of the M segments of the scan cycle according to a respective one of the M stored error signals in order to approximate an ideal frequency variation curve.

DESCRIPTION OF THE PREFERRED EMBODIMENTS

Figure 1:
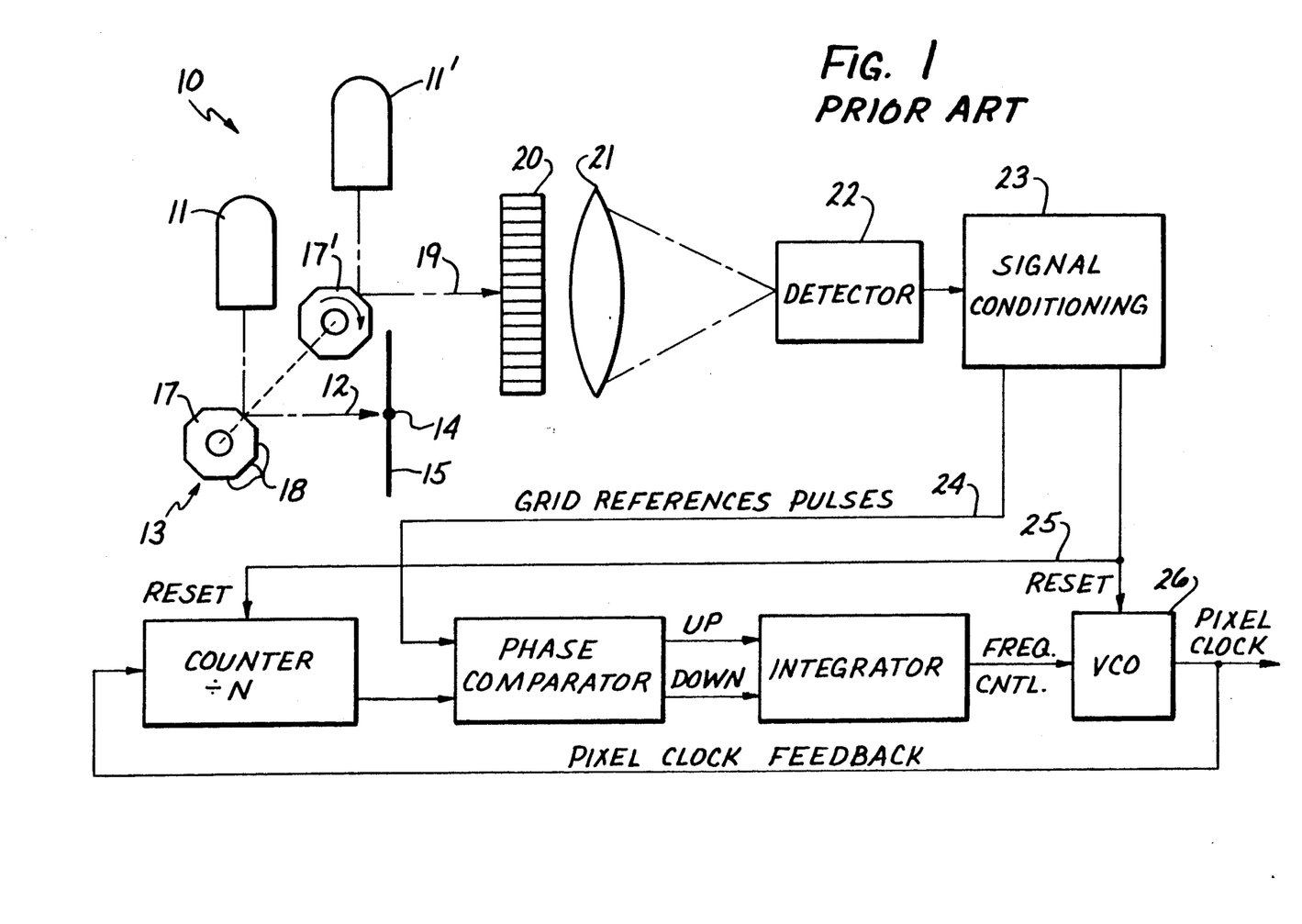
FIG. 1 of the drawings is a diagrammatic representation of a scanner system with portions in block diagram form, showing a grid clock and a pixel clock constructed according to the prior art.

FIG. 1 illustrates a scanner system 10 constructed according to the prior art. Generally, the scanner system 10 includes a light source 11 for producing a light beam 12. The light source 11 may include a known type of infrared laser diode and known conditioning optics, for example. The scanner system also includes scanning means 13 for directing the light beam 12 to a spot 14 at a predetermined location relative to the scanning means 13. The scanning means 13 also serves to move the spot 14 along a scan line 15 of specified length at the predetermined location. For that purpose, the scanning means 13 in the illustrated scanner system 10 includes a rotatable element or polygon 17 with a plurality of light reflecting facets 18 (eight facets being illustrated) and other known components for rotating the polygon 17 at a predetermined rate.

As the polygon 17 rotates, the light beam 12 is directed by the facets 18 toward a surface to be scanned at the scan line 15, such as the surface of a photoreceptor or a document to be read. There it scans or moves across the surface in a known manner along the scan line 15 in a series of scan cycles. Meanwhile, a second or reference light beam 19, either derived from the same light source 11 by such techniques as beam-splitting or from some other source, is directed by the polygon toward an accurately ruled grating or grid 20. That is done so that the reference light beam 19 moves along the grid 20 as the primary or scanning light beam 12 moves along the scan line 15. In that regard, FIG. 1 shows a polygon 17' directing the reference light beam 19 from a light source 11' toward the grid 20. That is done for illustrative convenience in order to more clearly show the two lights beams 12 and 19, the polygon 17 being the same physical structure as the polygon 17.

The grid 20 is suitably configured according to known techniques. It includes alternating clear and opaque areas (or reflecting and non-reflecting areas) that modulate the second light beam 19. For a nine inch scan line 15, for example, it may include a series of 301 parallel lines etched at 0.03 inch intervals on a ten to twelve inch strip of glass. Thus, the grid 20 extends nine inches like the scan line 15 and as the second beam 19 moves across the grid 20, the etched lines periodically block passage of light through the glass.

A suitable known type of optical arrangement 21 on the far side of the grid 20 directs the light toward a detector 22. The detector output is coupled to suitable known signal conditioning circuitry 23 that produces a train of grid reference pulses as well as a start-of-scan (SOS) signal and/or an end-of-scan (EOS) signal for synchronizing purposes, and those signals are coupled by lines 24 and 25 to a pixel clock circuit having a VCO 26 in a known type of phase locked loop (PPL). The PPL is thereby locked to the grid reference pulses to that the frequency of the output of the VCO 26 (i.e., the PIXEL CLOCK signal) at least partially tracks variations in the velocity of the spot 14 along the scan line 15. That helps compensate for the scanner non-linearity causing pixel position distortion. But it involves the drawbacks previously discussed.

Figure 2:
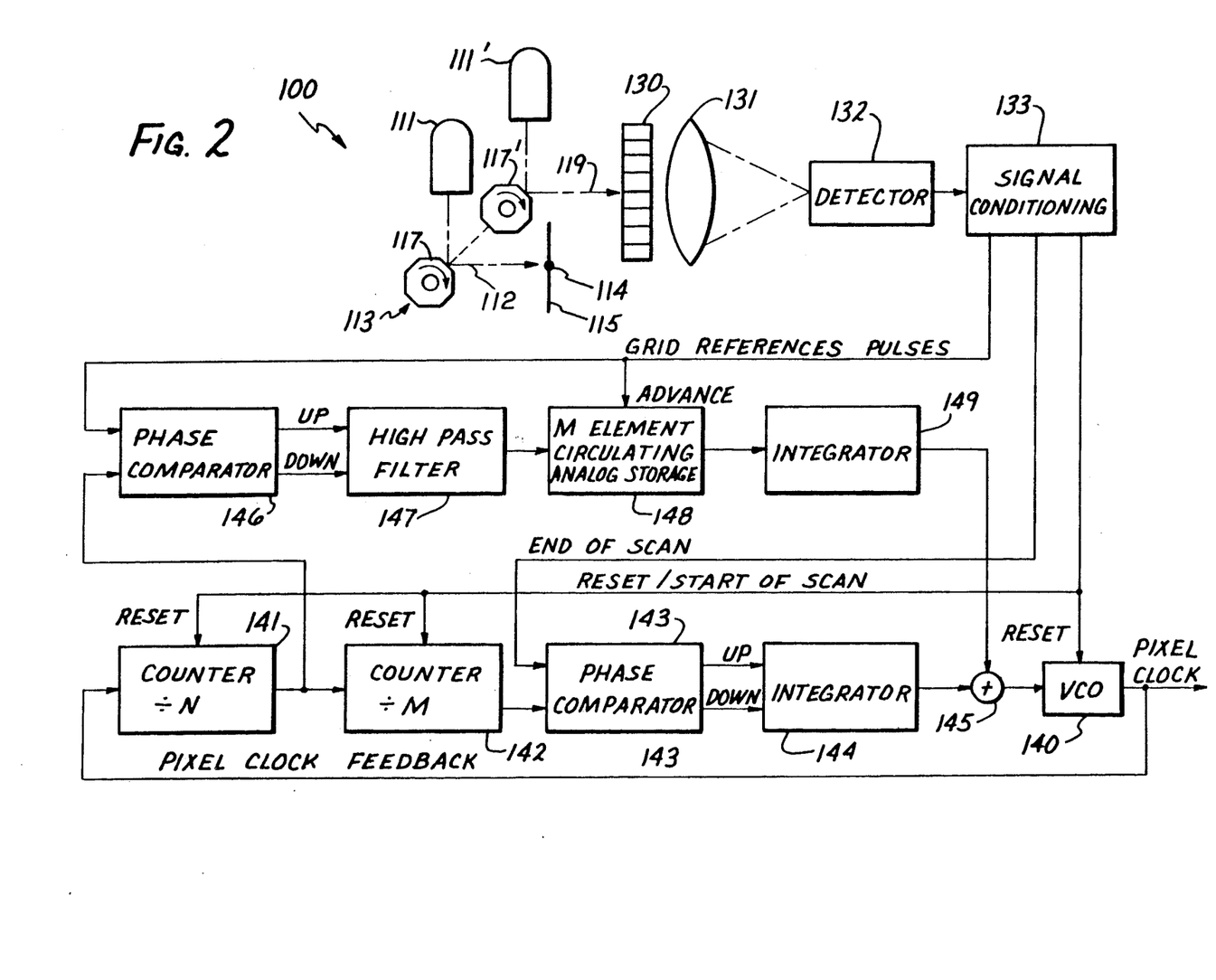
FIG. 2 is a diagrammatic representation a scanner system with portions in block diagram form, showing a grid clock, pixel clock, a frequency control circuitry constructed according to the present invention.

FIG. 2 illustrates a scanner system 100 constructed according to the invention. It is similar in some respects to the scanner system 10. For convenience, numerals designating parts of the scanner system 100 are increase by one hundred over those designating similar parts of the scanner system 10. Like the scanner system 10, the scanner system 100 includes a light source 111 for producing a light beam 112. It also includes scanning means 113 for directing the light beam 112 to a spot 114 on a scan line 115 and for moving the spot 114 along the scan line 115 in a series of scan cycles. In addition, the scanning means 113 includes a rotatable element or polygon 117 with a plurality of light reflecting facets and known components for rotating the polygon 117 at a predetermined rate. As the polygon 117 rotates, a second or reference light beam 119 is directed by the polygon toward a grid 130.

Unlike the scanner system 10, however, the grid 130 is very course. In other words, it has far fewer rulings at much greater intervals. The light passing through the grid 130 is directed by an optical arrangement 131 toward a detector 132, and signal conditioning circuitry 133 produces a train of grid references pulses, but it produces fewer reference pulses for each scan cycle, as few as five to ten pulses per scan cycle depending on the accuracy desired. Thus, those components serve as means defining a reference clock for producing a train of M reference pulses during each of the scan cycles such that each of the M reference pulses represents the occurrence of a respective one of M segments of the scan cycle. Each pulse represents one of M segments of the scan cycle (M being a predetermined integer) and keeping M small helps overcome problems of cost, complexity, and phase jitter.

The pixel clock circuitry shown in FIG. 2 is instrumental. It serves as means defining an oscillator for producing a train of clock pulses for use in controlling the light beam at a predetermined number of desired pixel positions along the scan line and it includes a VCO 140 that produces the PIXEL CLOCK signal. The VCO 140 is connected in two phase locked loops that serve as frequency control means responsive to the reference pulses for varying the frequency of the oscillator during the occurrence of each of the M segments of the scan cycle in order to approximate an ideal frequency variation curve over the entire scan cycle. In that regard, "varying the frequency of the oscillator in order to approximate an ideal frequency variation curve" means varying the frequency to approximate a relationship between the instantaneous frequency and the instantaneous spot velocity such that the instantaneous frequency is proportional to the instantaneous spot velocity.

The two phase locked loops can be combined according to known techniques, but they are illustrated separately for convenience. The first feedback loop includes a counter 141 that divides by an integer N, a counter 142 that divides by the integer M, a phase comparator 143, an integrator 144, and suitable summing circuitry 145. Those components are arranged as shown in FIG. 2 so that the VCO 140 produces N pulses for each of the M segments of each scan cycle for a total of $N \times M$ pulses per scan cycle. Thus, the first PPL is locked to the reference pulses in a way producing a desired number of pulses per scan cycle.

The signal conditioning circuitry 133 produces a EOS pulse as well as a Reset/SOS pulse. The counters 141 and 142 derive the total number of pixels in a scan line. The phase comparator 143 compares the EOS pulse and the total pixel end of count pulse at the output of the counter 142, one phase comparison at the end of each scan cycle. The output of the phase comparator 143 is coupled to the integrator 144 which provides the phase lock signal to the summing circuitry 145 ahead of the VCO 140. Thus, the first PPL maintains the proper total number of pixels in each scan line with a high degree of accuracy and with long term stability by setting the proper d-c level of the VCO 140 and automatically adjusting to compensate for component drifts.

The VCO 140 is also connected in a second PPL that includes the counter 141, a phase comparator 146, a high pass filter 147, an M element circulating analog storage circuit 148, an integrator 149, and the summing circuitry 145. The second PLL compares the phase of the grid references pulses to that of the output pulses from the counter 141, and in so doing provides the means to produce a varying frequency control voltage that maintains phase locking of the VCO 140 to the grid references during the scan cycle. It causes the frequency of the VCO 140 to vary during each of the M segments of each scan cycle at a particular rate for each of the M segments, a rate that is set by a plurality of M analog storage devices, M being the predetermined integer described previously as the number of segments of the scan cycle. In other words, frequency control means is configured to vary the frequency of the oscillator continuously during the occurrence of each of the M segments of the scan cycle at a rate established for that segment of the scan cycle, at a substantially constant rate for each segment.

Figure 3:
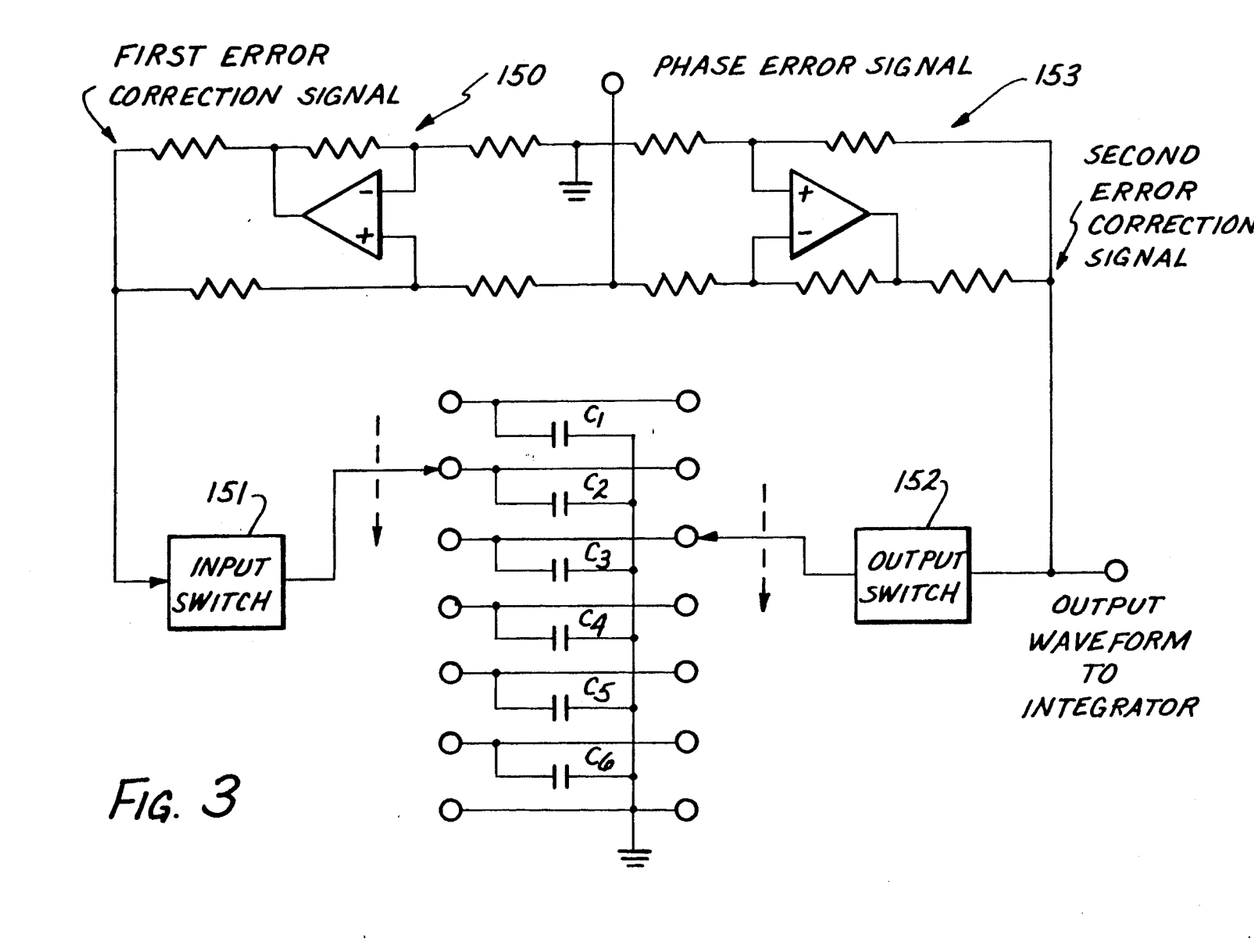
FIG. 3 is a diagrammatic representation of the analog storage circuit.

The analog storage circuit 148 employs known componentry and design techniques similar to those employed for the switched filter circuits described in U.S. Pat. Nos. 4,635,000, 4,663,523, and 4,694,156. It serves to store a number of analog voltages that can be commutated at its input and output terminals, the number of storage elements being equal to the number of segments of the scan cycle (i.e., M storage elements for M segments). The extra set of contacts after the contacts for $C_6$ represent the scan time period between the end of one scan cycle and the start of the next scan cycle. As shown in FIG. 3, the phase error signal at the output of the high pass filter 147 is coupled to a first differential amplifier circuit 150 which produces a first error correction signal. That signal is coupled by a circulating solid state input switch 151 to a plurality of M analog storage devices in the form of six capacitors $C_1-C_6$, and it adds to or subtracts from each stored error signal for lagging and leading phase errors respectively at the end of each respective segment of the scan cycle.

The commutated output is coupled by a solid state output switch 152, the differential amplifier circuit 153 producing a second error correction signal that adds to or subtracts from each stored error signal for leading and lagging phase errors respectively at the start of each respective scan segment (i.e., each respective segment of each scan cycle). The change in each stored error signal is thus proportional to the difference in the phase error at the start and end of each scan segment. As each stored error signal is updated, the error for that respective scan segment is reduced. That process continues until a steady state condition is reached when the error at each scan segment reaches zero.

The output waveform at the output of the output switch 152 is coupled to the input of the integrator 149 which produces a signal that varies at a rate and direction that is proportional to the stored error signals stored in the capacitors $C_1-C_6$. Thus, the frequency control means includes means defining an analog storage circuit for storing M analog error signals, each of which M error signals corresponds to a respective one the M segments of the scan cycle, and for switching to each of the M stored error signals as the respective one of the M segments of the scan cycle occurs.

Figure 4:
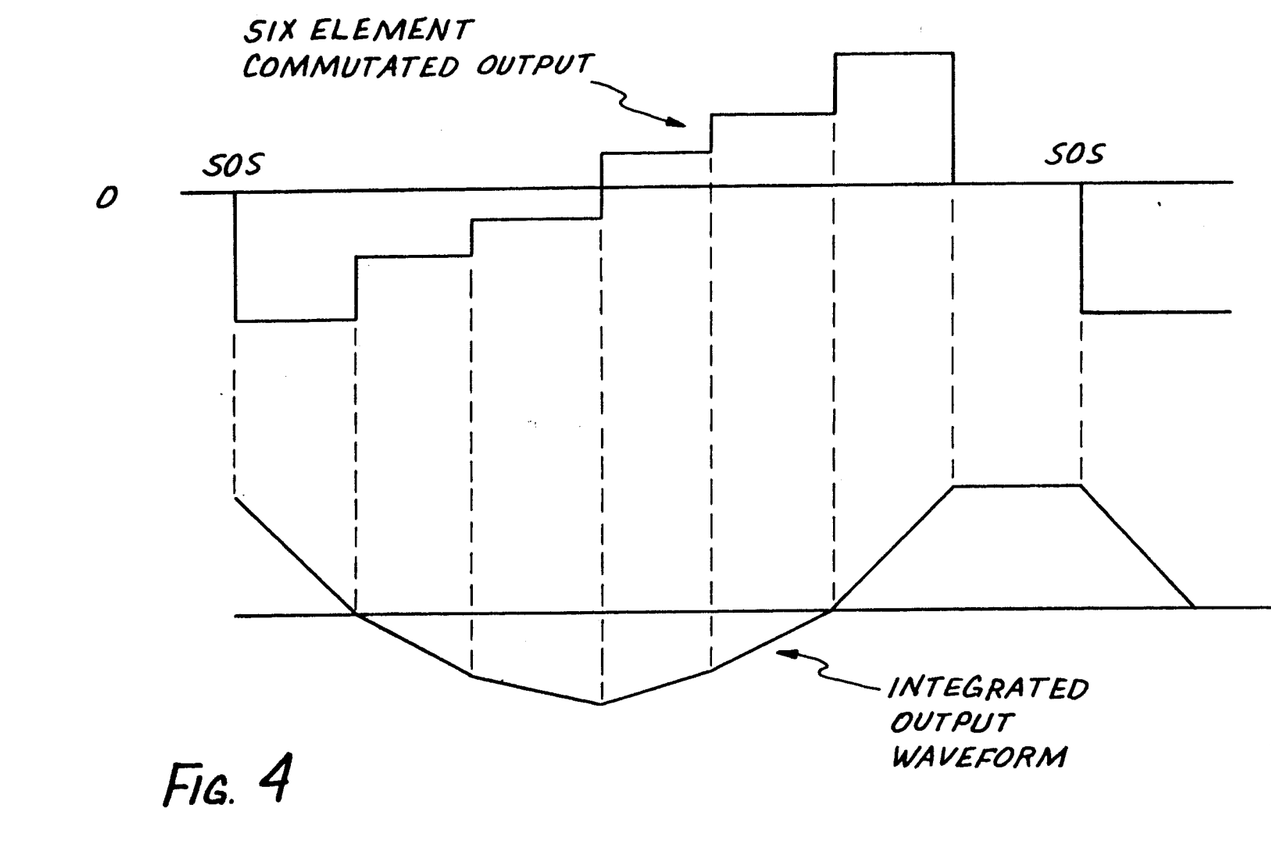
FIG. 4 is a diagrammatic representation relating the error signal output of the analog storage circuit to the integrated frequency control signal.

FIG. 4 illustrates the commutated analog output waveform to the integrator 149 and the integrator output waveform to the summing circuitry 145 for a typical case of six segments of the scan cycle and six storage elements. The output of the integrator 149 is summed with the output of the integrator 144 to produce a VCO control signal that is coupled to the VCO 140. In operation, the frequency of the VCO 140 varies in a way forcing phase coincidence between the output of the counter 141 and the grid reference pulses. Any error in phase coincidence causes the comparator 146 to produce a phase error signal that is coupled to the analog storage circuit 148 as previously described with reference to FIG. 3. The input and output commutation is offset by one storage element such that the output leads the input. In that way, the error signals that are developed at the end of any segment are averaged into the storage element for that segment of the scan. The error correction is a relatively slow response, requiring a number of error inputs to change the stored value. That averaging provides immunity to phase jitter.

Figure 5:
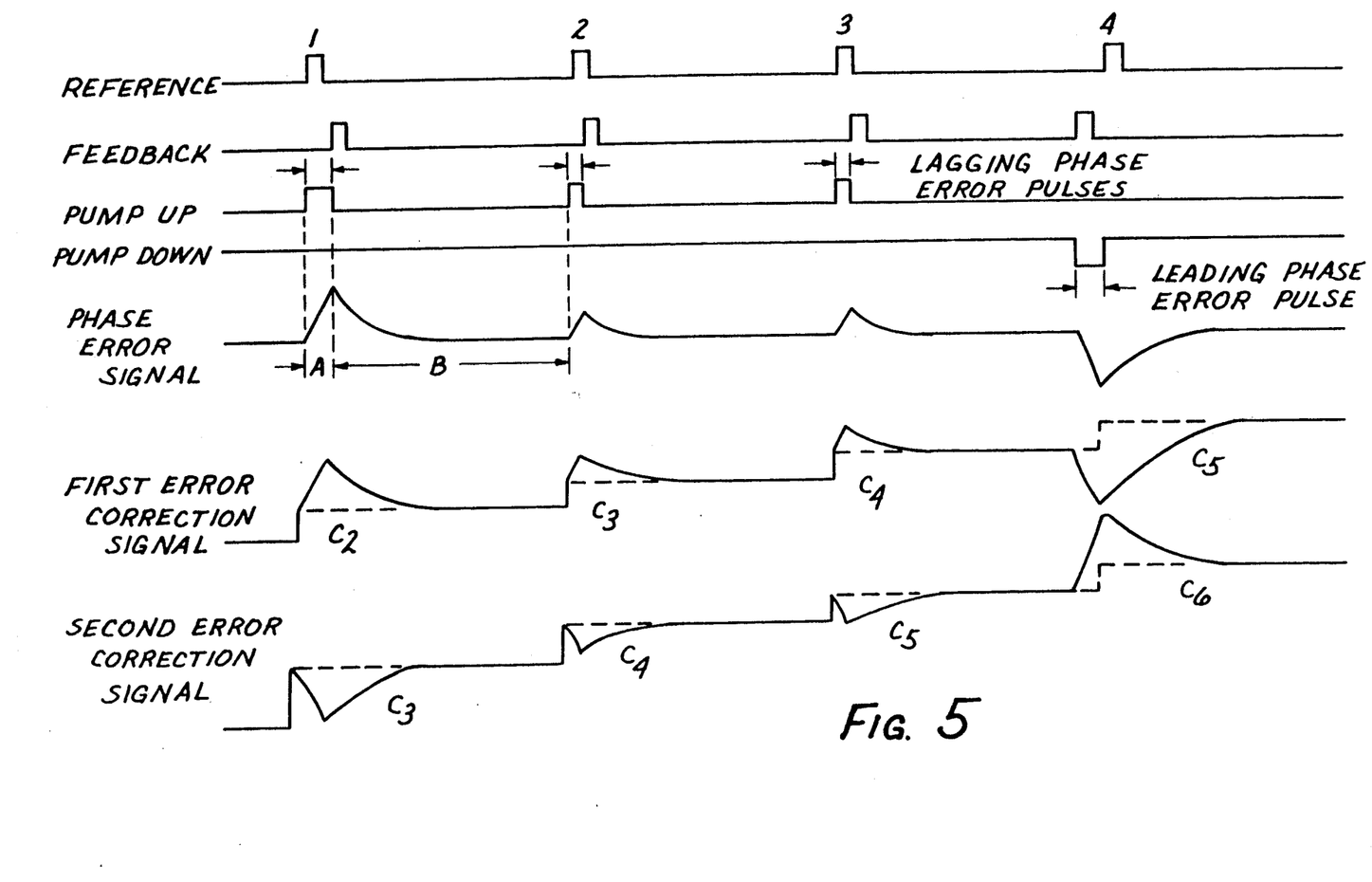
FIG. 5 shows the relationship of various other waveforms.

FIG. 5 illustrates various other waveforms for the second PPL. The uppermost waveform labelled REFERENCE represents a train of reference pulses from the signal conditioning circuitry 133. The next waveform beneath it labelled FEEDBACK represents the pixel clock feedback, the one labelled PUMP UP represents the UP output of the phase comparator 146, and the one labelled PUMP DOWN represents the DOWN output. The waveform labelled PHASE ERROR SIGNAL represents the input to the analog storage circuit 148. The waveform labelled FIRST ERROR CORRECTION SIGNAL represents that signal at the output of the first differential amplifier circuit 150 in FIG. 3, and the one labelled SECOND ERROR CORRECTION SIGNAL represents that signal at the output of the second differential amplifier circuit 153.

The waveforms are not to scale. Section A of the PHASE ERROR SIGNAL has been expanded for clarity. Typically section A will be a fraction of a pixel period while section B will be four or five hundred pixel periods. The first error correction signal is the sum of the capacitor voltage and the phase error signal while the second error correction signal is the capacitor voltage minus the phase error signal.

Figure 6:
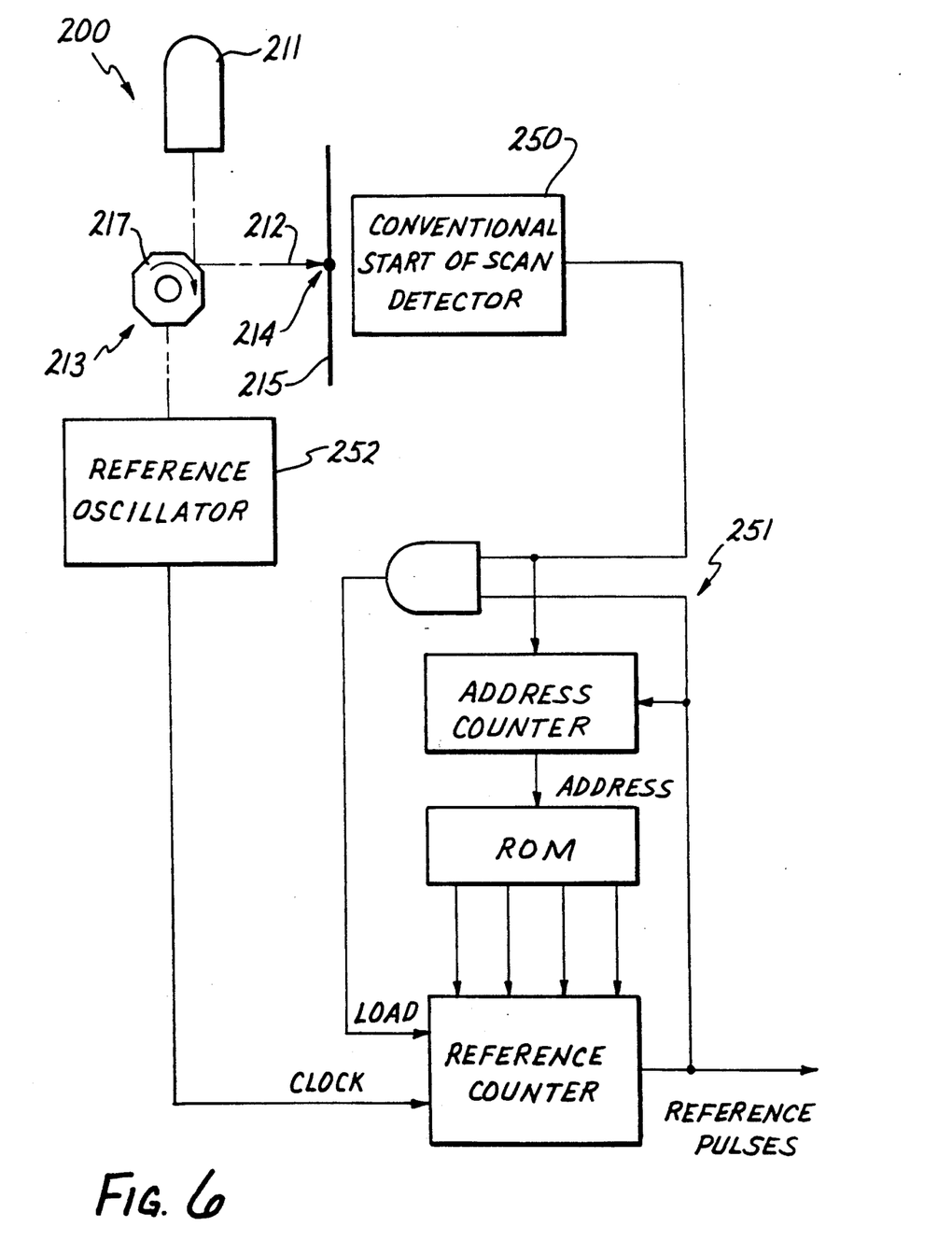
FIG. 6 is a diagrammatic representation in block diagram form of another embodiment utilizing the output of the motor reference oscillator to produce reference pulses.

FIG. 6 illustrates another scanner system 200 constructed according to the invention. It is similar in some respects to the scanner system 100. For convenience, numerals designating parts of the scanner system 200 are increase by one hundred over those designating similar parts of the scanner system 100. Like the scanner system 100, the scanner system 200 includes a light source 211 for producing a light beam 212. It also includes scanning means 213 for directing the light beam 212 to a spot 214 on a scan line 215 and for moving the spot 214 along the scan line 215 in a series of scan cycles. However, it does not include a grid clock. Instead, a conventional SOS detector 250 produces a SOS signal, and logic circuitry 251 produces a train of reference pulses derived from a motor drive reference oscillator 252.

The reference pulses may be thought of as representing constant angular increments. Of course, that translates to segments of the scan cycle. They can be derived from the motor drive reference oscillator or the motor drive control tachometer, known components in scanning systems, or from some other angular rotation measurement scheme. The ROM and associated circuits are shown producing reference pulses that are coupled to the phase comparator 146. Alternatively, the circuitry 251 can be configured to vary the integer N by which the counter 141 divides according to the angular increment (or segment of the scan cycle) indicated by the reference oscillator pulses and SOS signal.

Thus, the invention provides a scanner system that varies the pixel clock frequency in a way producing a segmented fit of the ideal frequency variation curve. The number of segments is chosen and a substantially constant rate of variation is established for each segment so as to achieve a sufficiently accurate approximation or fit of the ideal variation. So doing results in far fewer reference pulses per scan cycle so that a very course grid clock may be used, and that overcomes problems of phase jitter, cost, and complexity. In addition, the system self-adjusts to different scanning speeds without reprogramming or component changes.

I claim:
1. A scanner system, comprising:
 means defining a light source for producing a light beam;
 scanning means for directing the light beam to a spot on a surface to be scanned that is located at a predetermined location relative to the scanning means and for moving the spot across the surface along a scan line of predetermined length in a series of scan cycles;
 means defining a reference clock for producing a train of M reference pulses during each of the scan cycles such that each of the M reference pulses represents the occurrence of a respective one of M segments of the scan cycle, where M is an integer;
 means defining a first oscillator for producing a train of clock pulses for use in controlling the light beam at a predetermined number of desired pixel positions along the scan line; and,
 frequency control means responsive to the reference pulses for varying the rate of change of the fre- quency of the first oscillator during the occurrence of each of the M segments of the scan cycle and forcing phase coincidence with the reference pulses that define each of the M segments of the scan cycle in order to approximate an ideal frequency variation curve over the entire scan cycle, the frequency control means further including means defining an analog storage circuit for storing M analog error signals, each of which M error signals corresponds to a respective one the M segments of the scan cycle, and for switching to each of the M stored error signals as the respective one of the M segments of the scan cycle occurs.

2. A scanner system as recited in claim 1, wherein the frequency control means is configured to vary the frequency of the oscillator continuously during the occurrence of each of the M segments of the scan cycle at a rate established for that particular individual M segment of the scan cycle.

3. A scanner system as recited in claim 2, wherein the frequency control means is configured to adjust the rate for each of the M segments of the scan cycle toward a value achieving phase coincidence between the reference pulse representing that particular individual M segment of the scan cycle and the first one of the clock pulses occurring for that particular individual M segment of the scan cycle.

4. A scanner system as recited in claim 1, wherein the frequency control means is configured to vary the frequency of the oscillator at a substantially constant rate during each segment.

5. A scanner system as recited in claim 1, wherein the oscillator includes a VCO in a phase locked loop configured to produce a predetermined number of N clock pulses during each of the M scan cycles, wherein N is an integer.

6. A scanner system as recited in claim 1, wherein the means defining a reference clock includes a grid clock.

7. A scanner system as recited in claim 1, wherein the means defining a reference clock includes a second oscillator and associated logic circuitry configured to produce the reference pulses.

8. A scanner system as recited in claim 1, wherein
the scanning means includes a multifaceted rotating polygon, a motor for driving the multifaceted rotating polygon, and a reference oscillator for providing timing for the motor; and
the means defining a reference clock includes the reference oscillator and suitable associated logic circuitry configured to produce the reference pulses.

9. A scanner system, comprising:
means defining a light source for producing a light beam;
scanning means for directing the light beam to a spot on a surface to be scanned that is located at a predetermined location relative to the scanning means and for moving the spot across the surface along a scan line of predetermined length in a series of scan cycles;
means defining a reference clock for producing a train of M reference pulses during each of the scan cycles such that each of the M reference pulses represents the occurrence of a respective one of M segments of the scan cycle, where M is an integer;
means defining a first oscillator for producing a train of clock pulses for use in controlling the light beam at a predetermined number of desired pixel positions along the scan line; and
frequency control means responsive to the reference pulses for varying the frequency of the first oscillator during the occurrence of each of the M segments of the scan cycle in order to approximate an ideal frequency variation curve over the entire scan cycle, the frequency control means further including a feedback loop configured to produce a plurality of M stored error signals, each of which M error signals corresponds to a respective one the M segments of the scan cycle, and
the feedback loop including means for switching to each of the M stored error signals as the respective one of the M segments of the scan cycle occurs.

10. A scanner system as recited in claim 9, wherein the frequency control means is configured to cause the frequency of the oscillator to continuously vary during the occurrence of each of the M segments of the scan cycle at a substantially constant rate for that segment.

11. A scanner system as recited in claim 9, wherein:
the frequency control means is configured to vary the frequency of the oscillator continuously during the occurrence of each of the M segments of the scan cycle at a respective one of a plurality of M rates established for the M segments of the scan cycle,
the frequency control means being configured that each of the M stored error signals represents a respective of the M rates established for the M segments of the scan cycle.

12. A scanner system as recited in claim 9, wherein the oscillator is responsive to said frequency control means to produce N clock pulses for each scan segment and M×N clock pulses for each scan cycle, where N is an integer.

13. A scanner system as recited in claim 12, wherein the frequency control means is configured to compare each of the M reference pulses with the first one of the N clock pulses for the respective one of the M segments of the scan cycle in order to produce each of the M stored error signals.

14. A scanner system as recited in claim 9, wherein the frequency control means includes a multi-element circulating analog storage circuit.

15. A scanner system as recited in claim 9, wherein the means defining a reference clock includes a grid clock.

16. A scanner system as recited in claim 9, wherein the means defining a reference clock includes an oscillator and associated logic circuitry configured to produce the reference pulses.

17. A scanner system as recited in claim 9, wherein:
the scanning means includes a multifaceted rotating polygon, a motor for driving the multifaceted rotating polygon, and a reference oscillator for providing timing for the motor; and,
the means defining a reference clock includes a reference oscillator and suitable associated logic circuitry configured to produce the reference pulses.

18. A method of varying the frequency of a pixel clock oscillator in order to compensate for scanner non-linearity, comprising:
providing an oscillator for producing a train of N clock pulses for each of M segments of a scan cycle during which a spot produced by a scanning light beam moves along a respective one of M segments of a scan line, where M and N are integers;

producing a train of M reference pulses such that each of the reference pulses represents the occurrence of a respective one of the M segments of the scan cycle;

comparing the occurrence of each one of the M reference pulses with the occurrence of a first one of the N clock pulses for the respective one of the M segments of the scan cycle;

producing a plurality of M stored error signals according to the comparisons;

varying the frequency of the oscillator during the occurrence of each of the M segments of the scan cycle according to a respective one of the M stored error signals in order to approximate an ideal frequency variation curve over the entire scan cycle.

19. A scanner system, comprising:

means defining a light source for producing a light beam;

scanning means for directing the light beam to a spot on a surface to be scanned that is located at a predetermined location relative to the scanning means and for moving the spot across the surface along a scan line of predetermined length in a series of scan cycles;

means defining a reference clock for producing a train of M reference pulses during each of the scan cycles such that each of the M reference pulses represents the occurrence of a respective one of M segments of the scan cycle, where M is an integer;

means defining a first oscillator for producing a train of clock pulses for use in controlling the light beam at a predetermined number of desired pixel positions along the scan line; and, frequency control means responsive to the reference pulses for varying the rate of change of the frequency of the first oscillator during the occurrence of each of the M segments of the scan cycle and forcing phase coincidence with the reference pulses that define each of the M segments of the scan cycle in order to approximate an ideal frequency variation curve over the entire scan cycle, the frequency control means being configured to vary the frequency of the oscillator continuously during the occurrence of each of the M segments of the scan cycle at a rate established for that particular individual M segment of the scan cycle, the frequency control means also being configured to adjust the rate for each of the M segments of the scan cycle toward a value achieving phase coincidence between the reference pulse representing that particular individual M segment of the scan cycle and the first one of the clock pulses occurring for that particular individual M segment of the scan cycle.

20. A scanner system as recited in claim 19, wherein the frequency control means is configured to vary the frequency of the oscillator at a substantially constant rate during each segment.

21. A scanner system as recited in claim 19, wherein the frequency control means further including means defining an analog storage circuit for storing M analog error signals, each of which M error signals corresponds to a respective one the M segments of the scan cycle, and for switching to each of the M stored error signals as the respective one of the M segments of the scan cycle occurs.

22. A scanner system as recited in claim 19, wherein the oscillator includes a VCO in a phase locked loop configured to produce a predetermined number of N clock pulses during each of the M scan cycles, wherein N is an integer.

23. A scanner system as recited in claim 19, wherein the means defining a reference clock includes a grid clock.

24. A scanner system as recited in claim 19, wherein the means defining a reference clock includes a second oscillator and associated logic circuitry configured to produce the reference pulses.

25. A scanner system as recited in claim 19, wherein
the scanning means includes a multifaceted rotating polygon, a motor for driving the multifaceted rotating polygon, and a reference oscillator for providing timing for the motor; and the means defining a reference clock includes the reference oscillator and suitable associated logic circuitry configured to produce the reference pulses.

* * * * *